US006931492B2

United States Patent
Fox et al.

(10) Patent No.: US 6,931,492 B2
(45) Date of Patent: Aug. 16, 2005

(54) METHOD FOR USING A PORTION OF THE SYSTEM CACHE AS A TRACE ARRAY

(75) Inventors: David B. Fox, Littleton, MA (US); Joseph M. Hoke, Millerton, NY (US); Tin-Chee Lo, Fishkill, NY (US)

(73) Assignee: International Business Machines Corporation, Armonk, NY (US)

( * ) Notice: Subject to any disclaimer, the term of this patent is extended or adjusted under 35 U.S.C. 154(b) by 369 days.

(21) Appl. No.: 10/003,857

(22) Filed: Nov. 2, 2001

(65) Prior Publication Data

US 2003/0088738 A1 May 8, 2003

(51) Int. Cl.[7] .............................................. G06F 12/00
(52) U.S. Cl. ...................... 711/129; 711/153; 711/173; 714/45; 717/128
(58) Field of Search ................................ 711/123, 126, 711/129, 3, 153, 171, 173; 712/227, 229; 714/45; 717/127, 128, 124

(56) References Cited

U.S. PATENT DOCUMENTS

| 5,274,811 | A | | 12/1993 | Borg et al. | |
|---|---|---|---|---|---|
| 5,434,992 | A | | 7/1995 | Mattson | |
| 5,487,095 | A | | 1/1996 | Jordan et al. | 375/371 |
| 5,568,526 | A | | 10/1996 | Ferraiolo et al. | 375/356 |
| 5,875,464 | A | * | 2/1999 | Kirk | 711/129 |
| 5,884,023 | A | | 3/1999 | Swoboda et al. | |
| 5,894,575 | A | | 4/1999 | Levine et al. | |
| 5,920,719 | A | * | 7/1999 | Sutton et al. | 717/130 |
| 5,996,092 | A | | 11/1999 | Augsburg et al. | |
| 5,999,721 | A | | 12/1999 | Colglazier | |
| 6,073,213 | A | | 6/2000 | Peled et al. | |
| 6,094,729 | A | | 7/2000 | Mann | |
| 6,119,254 | A | * | 9/2000 | Assouad et al. | 714/724 |
| 6,154,857 | A | | 11/2000 | Mann | |
| 6,376,358 | B1 | * | 4/2002 | Fischer et al. | 438/621 |
| 2002/0013877 | A1 | * | 1/2002 | Naya et al. | 711/3 |
| 2003/0126508 | A1 | * | 7/2003 | Litt | 714/39 |

FOREIGN PATENT DOCUMENTS

EP            0348994 A2 *  1/1990  ........... G06F/11/00

* cited by examiner

Primary Examiner—Christian P. Chace
(74) Attorney, Agent, or Firm—Floyd A. Gonzalez; Cantor Colburn LLP (57) ABSTRACT

A method is disclosed for instructing a computing system to allocate a trace array from an original cache memory, where the method includes dividing the original cache memory into a reduced-size cache memory and a trace array, permitting storage of trace signal data into the trace array, and permitting retrieval of the trace signal data from the trace array.

16 Claims, 9 Drawing Sheets

DUAL FUNCTION D-CACHE (READ MODE)

DATA TRANSMISSION SYSTEM
FIG. 7

PICKING THE CENTERED PHASE
FIG. 8

METHOD FOR USING A PORTION OF THE SYSTEM CACHE AS A TRACE ARRAY

BACKGROUND

During system characterization or chip testing, for example, it is desirable to trace some on-chip vital signals for consecutive cycles. In order to log these signal values on a cycle-by-cycle basis for typically thousands of cycles, a dedicated Trace Array is conventionally used. Since the Trace Array is generally only used in the test mode, it is considered to be overhead to the chip real estate. The ability to trace internal ASIC signals and busses in a "system on a chip" environment is increasingly important when embedded processors are involved in order to provide the capability to trace processor I/O operations as they relate to other events within the system.

SUMMARY

This disclosure presents a method for instructing a computing system to allocate a trace array from an original cache memory, where the method includes dividing the original cache memory into a reduced-size cache memory and a trace array, permitting storage of trace signal data into the trace array, and permitting retrieval of the trace signal data from the trace array.

BRIEF DESCRIPTION OF THE DRAWINGS

The present disclosure will be better understood, and its features and advantages will become apparent to those skilled in the pertinent art by referencing the accompanying drawings, in which.

DETAILED DESCRIPTION OF PREFERRED EMBODIMENTS

In a preferred embodiment processor with a cache array, a portion (e.g., one half) of the cache array may be used as a trace array when a tracing function is invoked, while the remaining portion continues to serve as a cache array.

Figure 1:
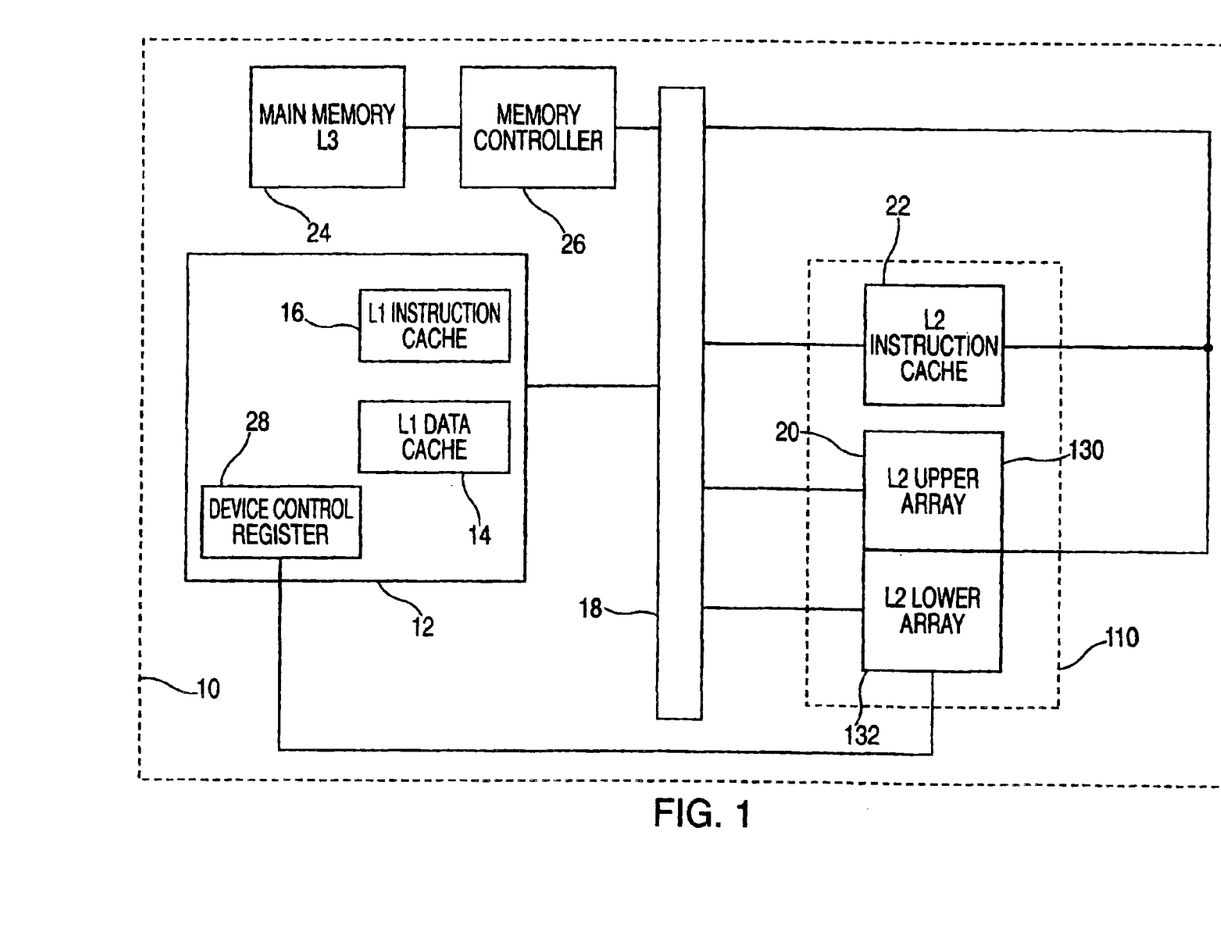
FIG. 1 shows a block diagram of an exemplary processing system.

Referring to FIG. 1, an embodiment of a system-on-chip environment 10 is illustrated and includes a CPU core 12 having an L1 data cache 14 and an L1 instruction cache 16 and a processor local bus (PLB) 18, wherein the PLB 18 and CPU core 12 are preferably communicated with each other. System-on-chip environment 10 also includes an L2 cache 110 having an L2 data cache 20 and an L2 instruction cache 22 wherein the L2 cache 110 is communicated with the CPU core 12 via PLB 18. Typically, the L1 data cache 14 can read or write to the L2 data cache 20 and the L1 instruction cache 16 can only read the L2 instruction cache 22. The L2 instruction cache 22 is usually written to by a main memory L3 24 via a memory controller 26 and the PLB 18. In accordance with an embodiment of the invention, L2 data cache 20 is divided into two parts: an upper array 130, which is always a data cache, and a lower array 132. The lower array 132 may be either a cache array or a trace array. The lower array 132 is typically controlled via a "Trace_Mode" signal that is generated by a device control register (DCR) 28 that is disposed within the CPU core 12. When the logic state of the "Trace_Mode" signal is zero, the L2 data cache 20 is fully configured as a cache and both the upper array 130 and the lower array 132, function as a cache array. When the logic state of the "Trace_Mode" signal is one, the upper array 130 will function as a cache array and the lower array 132 will function as a trace array, having completely independent read/write control and address and trace input/output.

Figure 2:
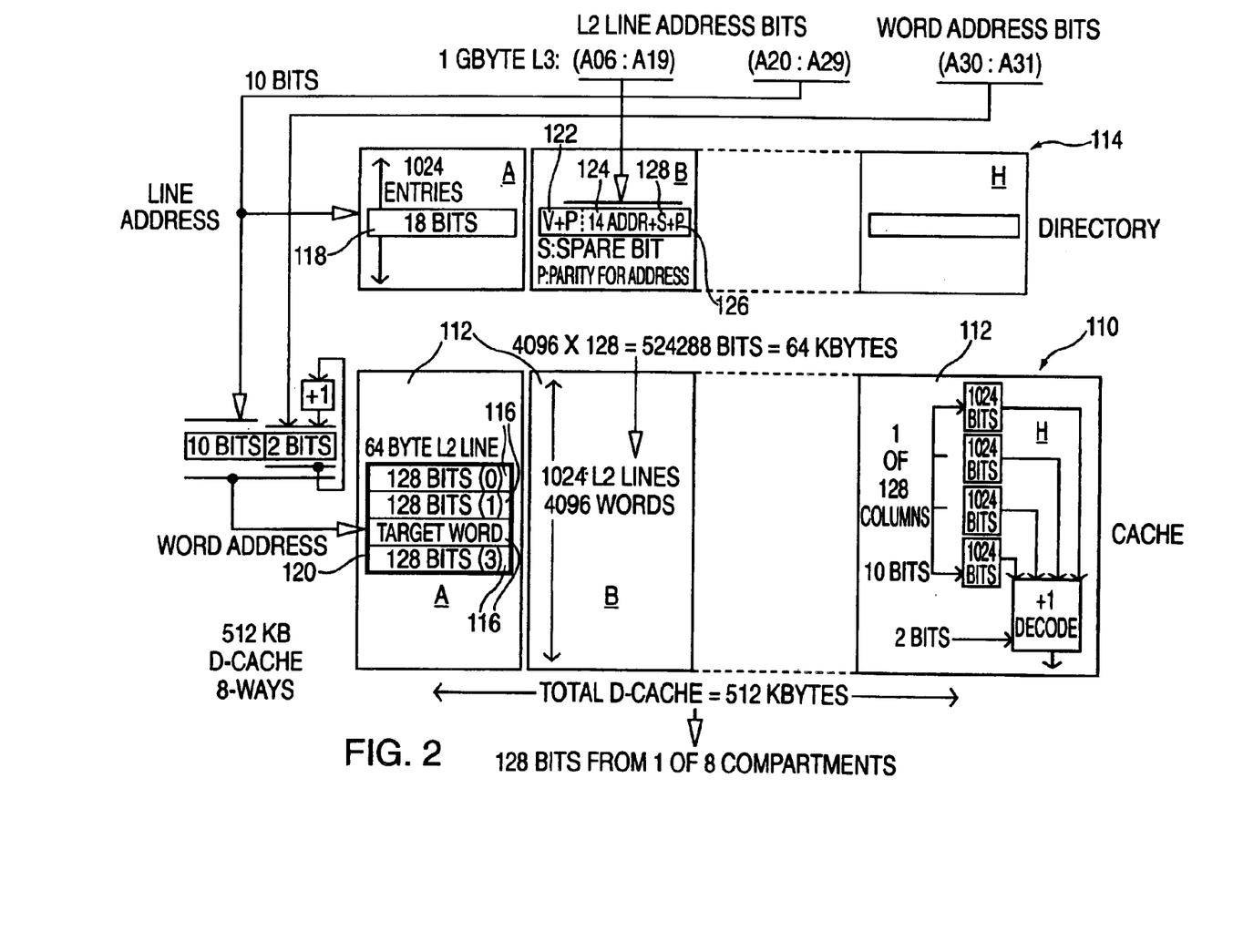
FIG. 2 shows a cache system with memory usable in the processing system of FIG. 1.

Referring now to FIG. 2, an exemplary cache design comprises a 512K byte L2 cache indicated generally by the reference numeral 110. The cache 110 is implemented in Eight-Way associativities (A to H), usable in a System-On-Chip environment. Each compartment 112 consists of 4096 words 116 and each of which is 128 bits (Quad Word) wide. The accompanying Directory Array 114 includes 1024 words 118 or congruence classes. Each entry 118 in the Directory Array 114 represents the presence of an L2 line 120 having a size of 64 bytes. The entry 118 of the Directory 114 consists of the Valid field 122 and the Address field 124, with a parity bit 126 for parity protection. The Address field 124 is 14 bits plus a spare bit S, at reference numeral 128. When the L2 cache 110 is in the 512K-byte mode, such as during normal system operation, the spare bit 128 is not used. However, when the cache 110 is degraded to 256K bytes, such as during chip debug in trace mode, the spare bit 128 is used to extend the Address field 124.

Figure 3:
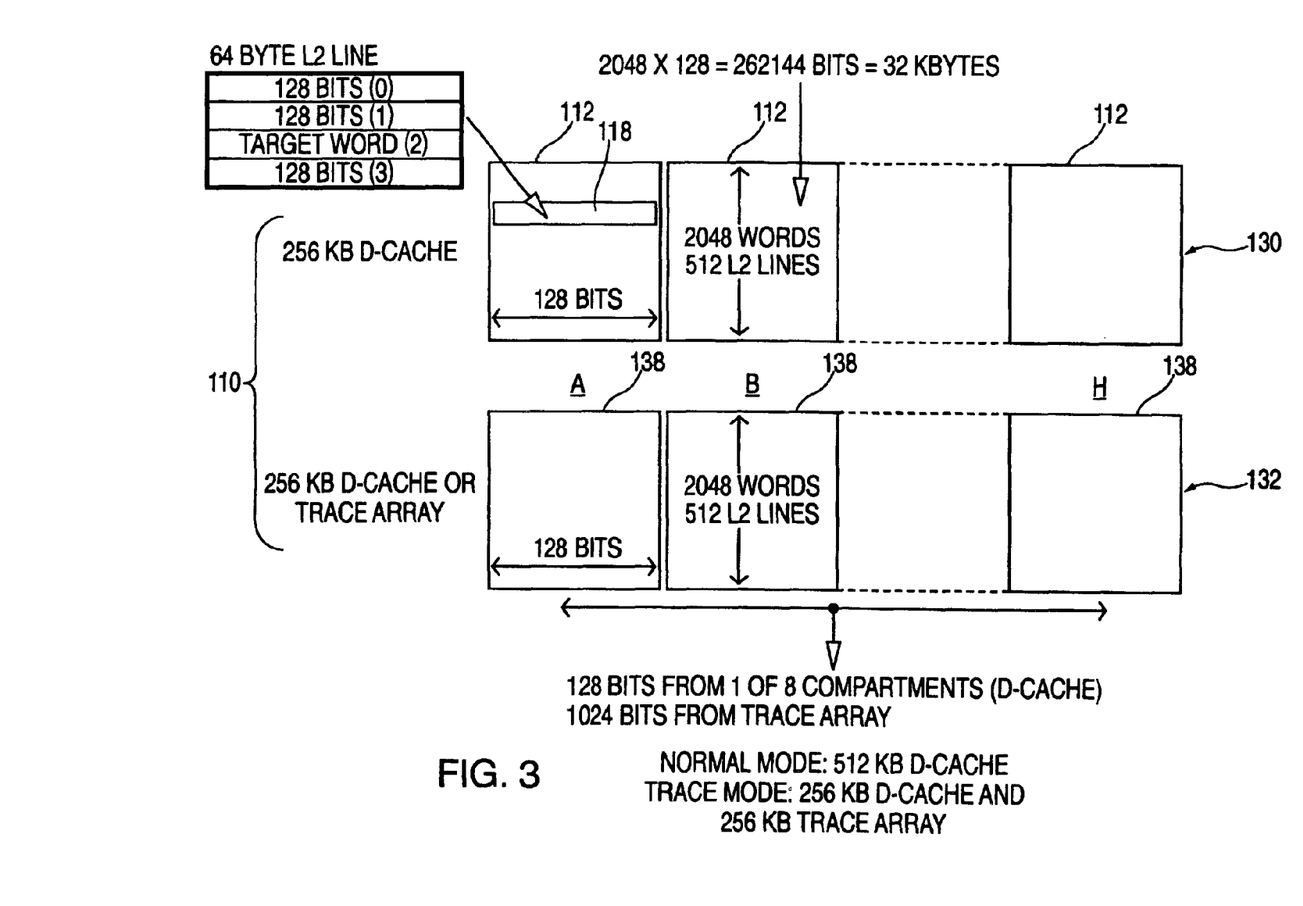
FIG. 3 shows a split cache configuration of the cache memory of FIG. 2.

As shown in FIG. 3, the cache array 110 of FIG. 2 is split into two arrays, as logically illustrated in FIG. 3. In system mode, both arrays will serve as the L2 cache 110, which requires A(20) to A(31) to address each of its entries 118. In debug mode, the upper array 130 remains to perform the cache function while the lower array 132 serves as a single image Trace memory array 132, wherein the associativity partition is not defined. In trace mode, one less bit is needed to address the cache entries 118, namely A(21) to A(31), and the Directory Address field 124 requires one more bit, namely A(20), to represent the high order bits of the requesting address. Here, the spare ("S") bit 128 in the Directory 114 is used for this purpose.

Figure 4:
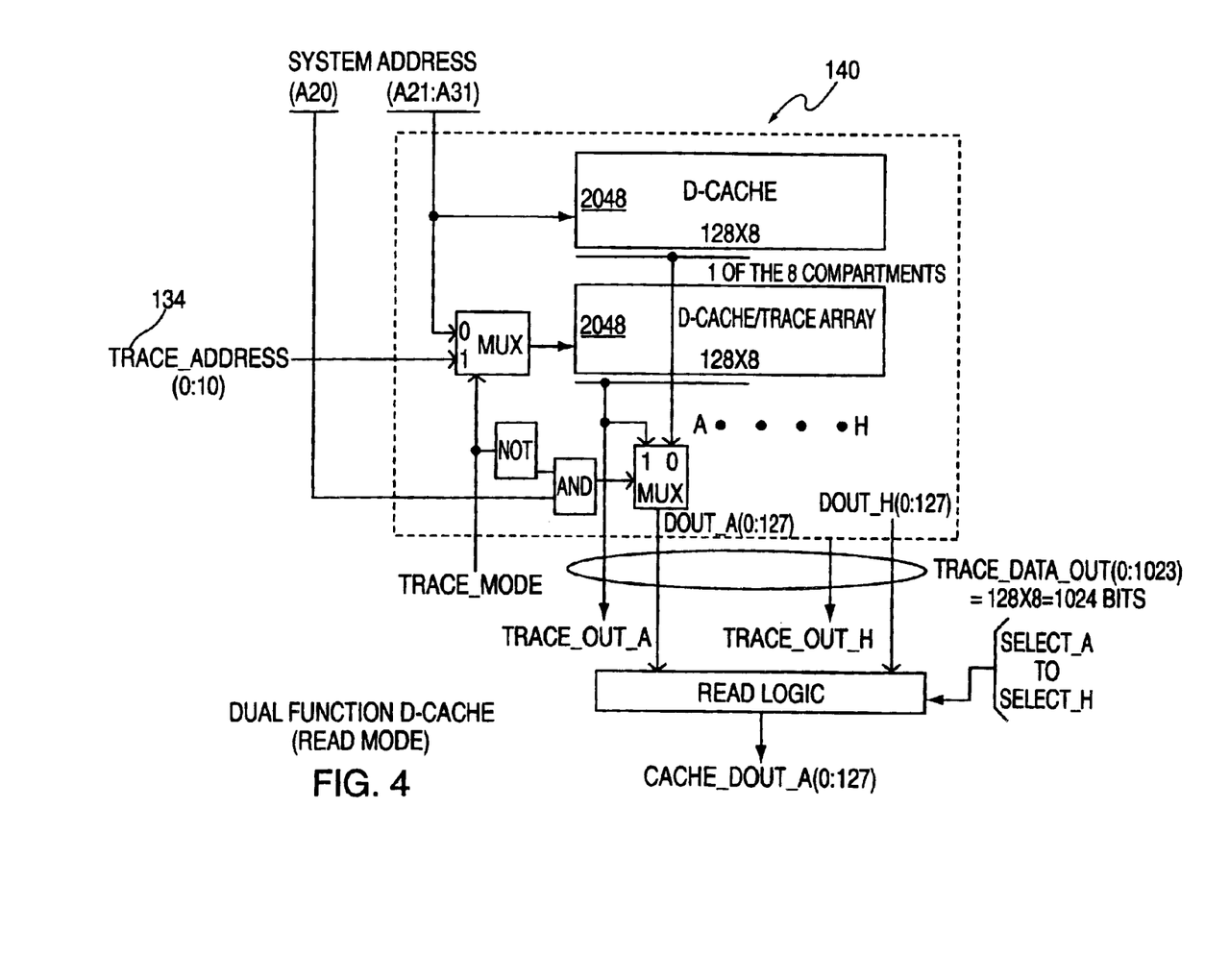
FIG. 4 shows the split cache configuration of FIG. 3 in a read mode.

A Read operation is shown in FIG. 4. A DC signal called "Trace_Mode" is used to determine whether the L2-Cache 110 is in pure cache mode or in Cache/Trace mix mode. When Trace_Mode=0 during normal system operation, A(20) becomes a selection signal to select either the upper array 130 or the lower array 132. One of the SELECT_A to SELECT_H signals will be ON to indicate which one of the eight compartments 112 is selected, and its 128 bit output will be the read data to the processor. When Trace_Mode=1 during trace operation, the upper array 130 will continue to serve as L2 cache, albeit half the normal size in this exemplary example.

The lower array 132 will not be addressed by the system address, but by its own Trace_Address(0:10), as indicated at reference numeral 134 of FIG. 4. The output of the lower array 132 will be a broadside 1024 bit (128 times 8) trace signal. Both the upper 130 and the lower 132 arrays have become functionally independent. This type of design has two separate output busses. The lower array or Trace Array 132 has a 1024 bit output and the cache has a 128-bit output to the processor. The method of dumping the contents of the Trace Array 132 is implementation dependent. If the processor is the one that reads the Trace Array 132, the trace output may share the processor read bus through the Read logic in which case the trace read-out is not broad sided but in groups of 128 bits selected by the compartment 148 selection signals.

Figure 5:
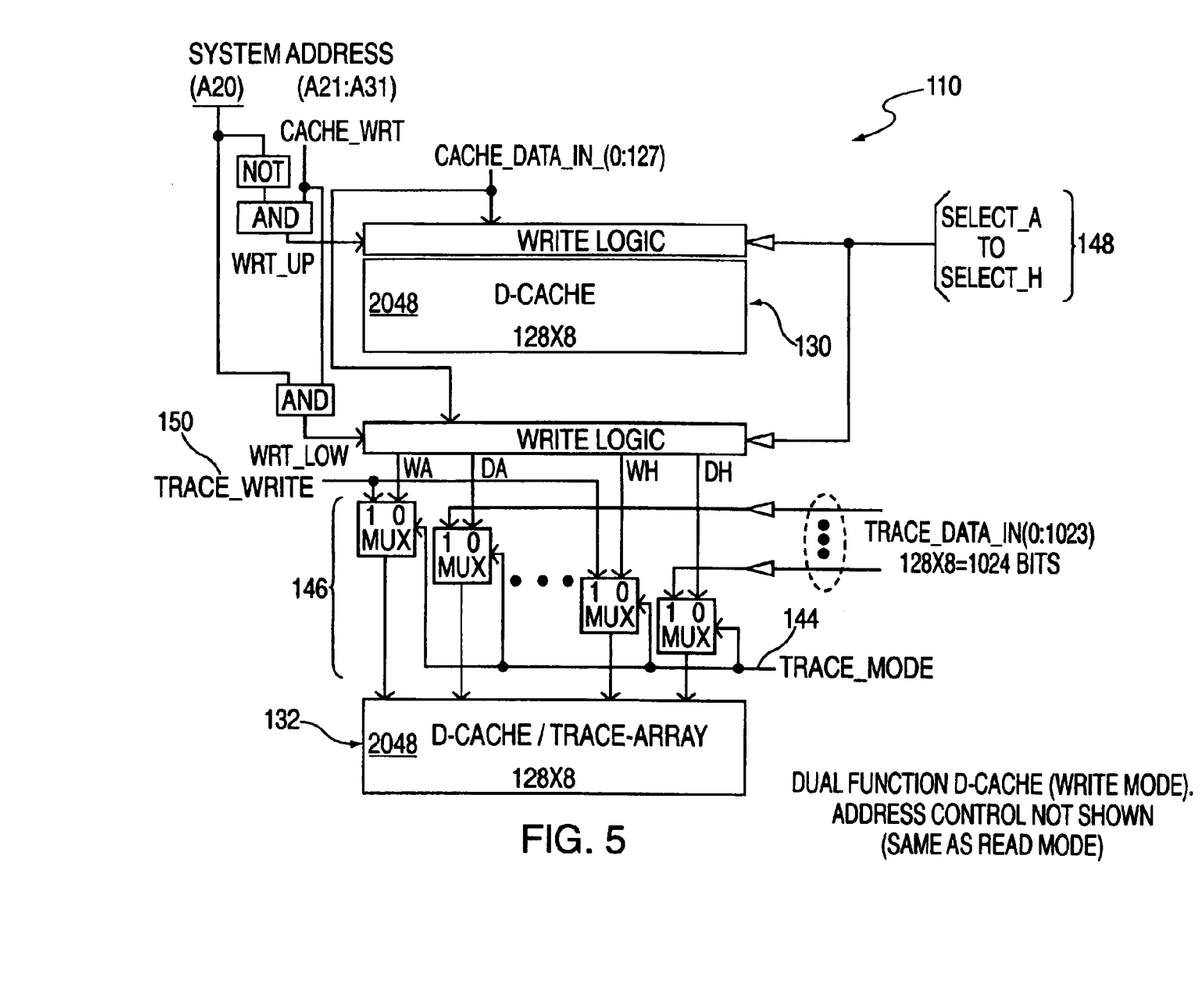
FIG. 5 shows the split cache configuration of FIG. 3 in a write mode.

FIG. 5 shows the dual function D-Cache 110 in write mode. The Address Logic is substantially similar to that of the Read function 140. In system mode, the Cache_Data_In(0:127), from processor 40 when there is a hit or from main memory L3 when there is a miss, will be written into the upper array 130 or the lower array 132, depending upon the value of A(20). One of the SELECT_A to SELECT_H signals will direct this data into the proper compartment 112. The write operation is controlled by a signal "Cache_Wrt" and address bit A(20) will determine which array, 130 or 132, should take the incoming data.

The "Trace_Mode" signal 144 must be "0" during system mode so that the MUX logic 146 together with the SELECT signals 148 will direct the system data into the lower array 132, which is part of the Cache 110. During trace mode where Trace_Mode=1, a separate write control signal "Trace_Write" 150 is used to write only the lower array 132; and the trace data, which is 1024 bits wide, is written broadside into the lower array which serves as Trace Array 132.

Figure 6:
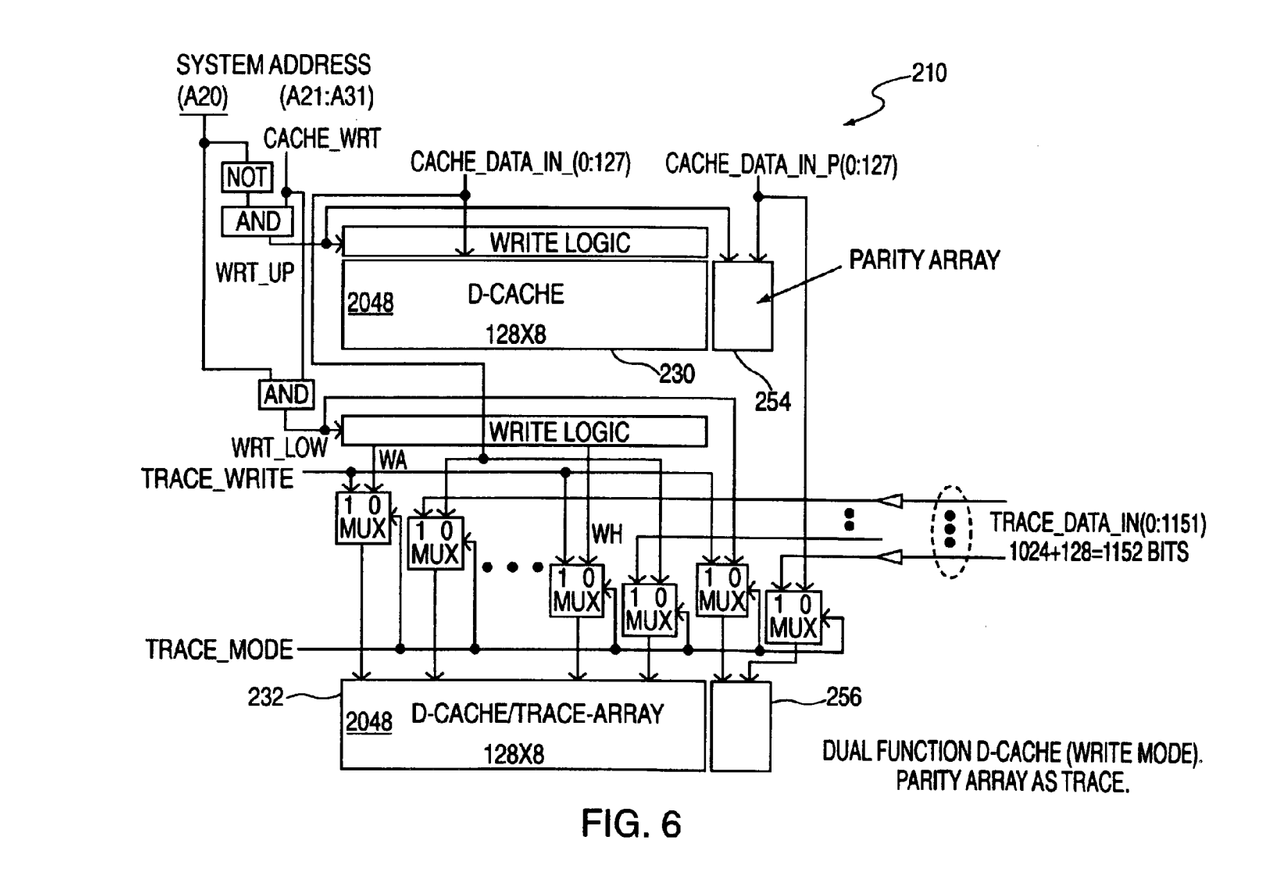
FIG. 6 shows a split cache configuration with parity protection.

FIG. 6 shows a parity protected dual function D-Cache 210 in write mode. The dual function cache 210 is similar to the dual function cache 110, but has additional provision for storage of parity data. In system mode, the Cache_Data_In(0:127), from processor 40 when there is a hit or from main memory L3 when there is a miss, will be written into the upper array 230 or the lower array 232, depending upon the value of A(20), while the parity bit data will be written into the corresponding parity array, namely parity array 254 for data written to the upper array 230, or parity array 256 for data written to the lower array 232.

Figure 7:
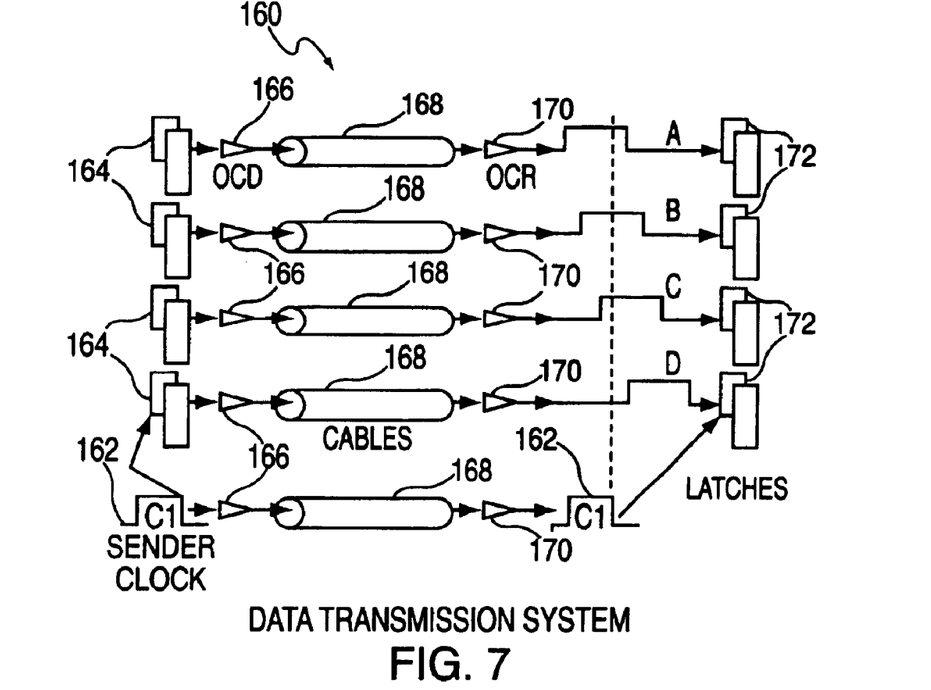
FIG. 7 shows a data transmission system.

Turning now to FIG. 7, one application of the above concept is discussed. In a system-on-a-chip implementation, the chip typically comprises a CPU core, a level-1 cache (L1) within the CPU core, and a level-2 cache (L2) around the CPU core. For an application in which such a chip is to perform packet switching functions, for example, it would serve as a bridge between a networking environment and a main server complex. The main Server complex may be, for example, an IBM z900; so a link is needed to connect between the network processor and the Server complex. This link can be strategically implemented in a Self-Timed Interconnect ("STI") scheme, because it provides a stable and self compensated data transmission through a set of cables, such as have been shown in U.S. Pat. Nos. 5,568,526 and 5,487,095, assigned to the present assignee and incorporated by reference herein in their entirety.

The principle of operation of such an STI scheme may be understood with reference to the following. Consider the non-STI data transmission system 160 of FIG. 7. Data is launched by a clock from a set of latches 164 on the transmission end of a link through a set of off-chip drivers ("OCD") 166 into a set of conductors 168. In this case, the launching clock 166 is sent along with the data. At the receiving end of the conductors 168, a corresponding set of off-chip receivers ("OCR") 170 processes the incoming signals, which are then captured by receiving latches 172 using the received clock 162. Although the data for each conductor 168 is launched at the same time, the arrival times at the receiver latches 172 may be skewed because of the variations of the individual transmission paths. FIG. 7 shows only Path-B is properly captured by the falling edge of the C1 clock 162. Other paths are either captured too early (Path-C) or too late (Path-A) or wrongly (Path-D).

Figure 8:
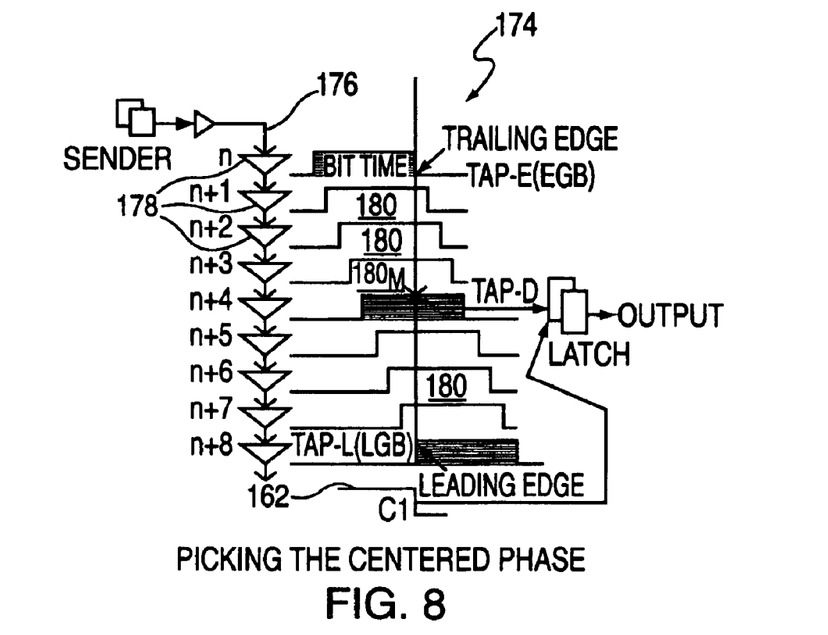
FIG. 8 shows a centered phase selection.

The STI concept is shown in FIG. 8. Each data input signal to a receiver chip 174 is fed to a delay line 176 with multiple taps. The delay line 176 contains many identical delay elements 178, with the output of each delay element representing a unique phase of the incoming data signal. At the core of the STI chip 174 is the phase selection logic, which is responsible for selecting the preferred phase of the data bit to be sampled, preferably at the center of its data-valid window 180. Once identified, a built-in servo-mechanism locks the data phase selection and makes dynamic adjustments to maintain the lock; hence the name "Self-Timed Interconnect."

Central to the phase-selection process is centering the data-valid window with respect to the edge of the sampling clock 162. The edges of the data bit must be found by means of an edge-detection process.

As shown in FIG. 8, the falling edge of C1or 162 aligns with the trailing edge of the data window and identifies the corresponding tap as Tap-E or Early Guard Band ("EGB"). In a similar manner, the falling edge of C1aligns with the leading edge of the data window, which occurs at Tap-L or Late Guard Band ("LGB"). Finding the center of the data window becomes a simple matter of choosing a tap midway between Tap-E and Tap-L, which is Tap-D. The falling edge of C1falls directly into the center of the data window. This process is known as "Bit Synchronization".

Figure 9:
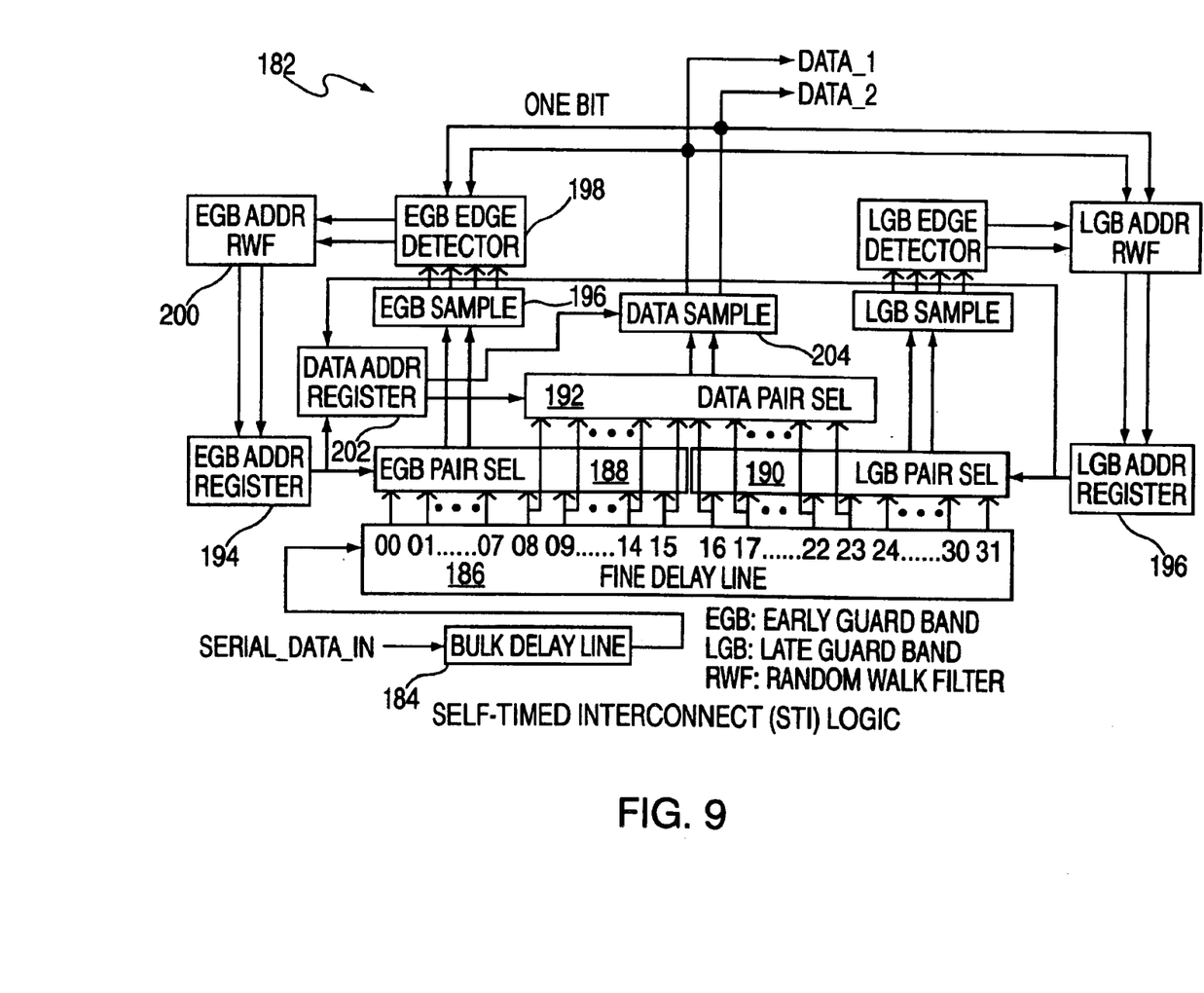
FIG. 9 shows a self-timed interconnect.

FIG. 9 shows a block diagram of the STI one-bit with phase-selection logic, indicated generally by the reference numeral 182. The serial data is fed into a "Bulk Delay Line" 184, and then into a "Fine Delay Line" 186. The serial data is in form of double data rate ("DDR"), which means two data windows per cycle. The Fine Delay Line 186 has 32 output taps, which are divided into three groups. The first group, comprising delay element-0 to delay element-15, is assigned to the EGB Pair Selector 188; the second group, comprising delay element-16 to delay element-31, is assigned to the LGB Pair Selector 190.

The third group of delay elements 8 to 23, is assigned to Data Tap Pair Select 192, and shared with the upper half of the EGB and the lower half of the LGB, respectively. From each of the three groups, an adjacent pair of phases is selected. So there are 15 possible pairs formed by the 16 delay elements in the EGB, LGB, and Data groups. The three groups of delay element outputs are fed as inputs to the three pair-selector blocks. The "EGB Pair Selector" 188 on the left chooses the EGB tap, or Tap-E, which is controlled by the EGB Address Register 194. The "LGB Pair Selector" 190 on the right chooses the LGB tap, or Tap-L, which is controlled by the LGB Address Register 196.

Within the EGB selection on left side of FIG. 9, the EGB Pair Selector 188 first picks a pair of predetermined phases near the upper part of the delay element group, such as, for example, the outputs of element-11 and element-12. The selected phase pair goes into the "EGB Sample" logic 196. Each phase of the pair, which contains half-cycle data windows, is converted into two full cycle data samples. So the "EGB Sample" block 196 serves also as a serial to parallel converter. Hence, the "EGB Edge Detector" 198 uses four samples to determine whether or not the selected pair falls onto the data window transition edge. The Edge Detector logic 198 generates UP or DOWN signals to either increment or decrement the EGB Address Register 194.

A Random Walk Filter ("RWF") 200 is used to avoid instantaneous adjustment in favor of adjustment based on trend over many cycles. The LGB loop on the right side of FIG. 9 operates in a similar manner, with the exception that the LGB Pair Selector 190 first picks a pair near the lower part of the delay element group, such as, for example, the outputs of element-18 and element-19. Accordingly, the selected EGB and LGB are initially crowded together in the middle of the delay line 184, and work their way towards the two ends of the Fine Delay Line 186. The Bulk Delay Line 184 is used to coarsely place the entire data window near the center of the Fine Delay Line 186 so as to prevent the case where bits, such as half of bit(i) and half of bit(i+1), are stored.

The output of the EGB Address Register 194 and the output of the LGB Address Register 196 are fed into the Data Address Register 202, where the average value of the Tap-E address and the Tap-L address is calculated. The Data Pair Selector 192, in the middle of FIG. 9, uses this result to select a pair of data phases. One of the data phase pair is strategically selected and the "Data Sample" logic 204 converts it into a pair of full cycle semi-parallel data, DATA_1 and DATA_2. These two data signals are then converted into four fully parallel data signals of two-cycle width in the down stream logic.

In typical operation, the EGB loop shown on the left and the LGB loop shown on the right are two servo loops. During timing mode, these two loops work their way to locate the trailing edge and the leading edge of the data bit within the Fine Delay Line 186. The manner of convergence can be monitored and studied in the simulation environment during the chip design phase. After the hardware has actually been built, there is insufficient information available in the absence of a trace array as to how the convergence processes actually take place. Although the values of EGB address, LGB address, and Bulk delay tap address, etc., can be traced over thousands of cycles, this requires a very large trace array to do the job. The present disclosure teaches the use of half of the cache array as a trace array to characterize the STI, and switches it back to cache function when characterization is completed. Because the characterization of STI is quite independent from the rest of the logic functions, the STI signals to be traced by this dual function cache/trace array may also be multiplexed or time-shared with other logic signals to be traced, greatly enhancing the tracing capability of the chip.

Figure 10:
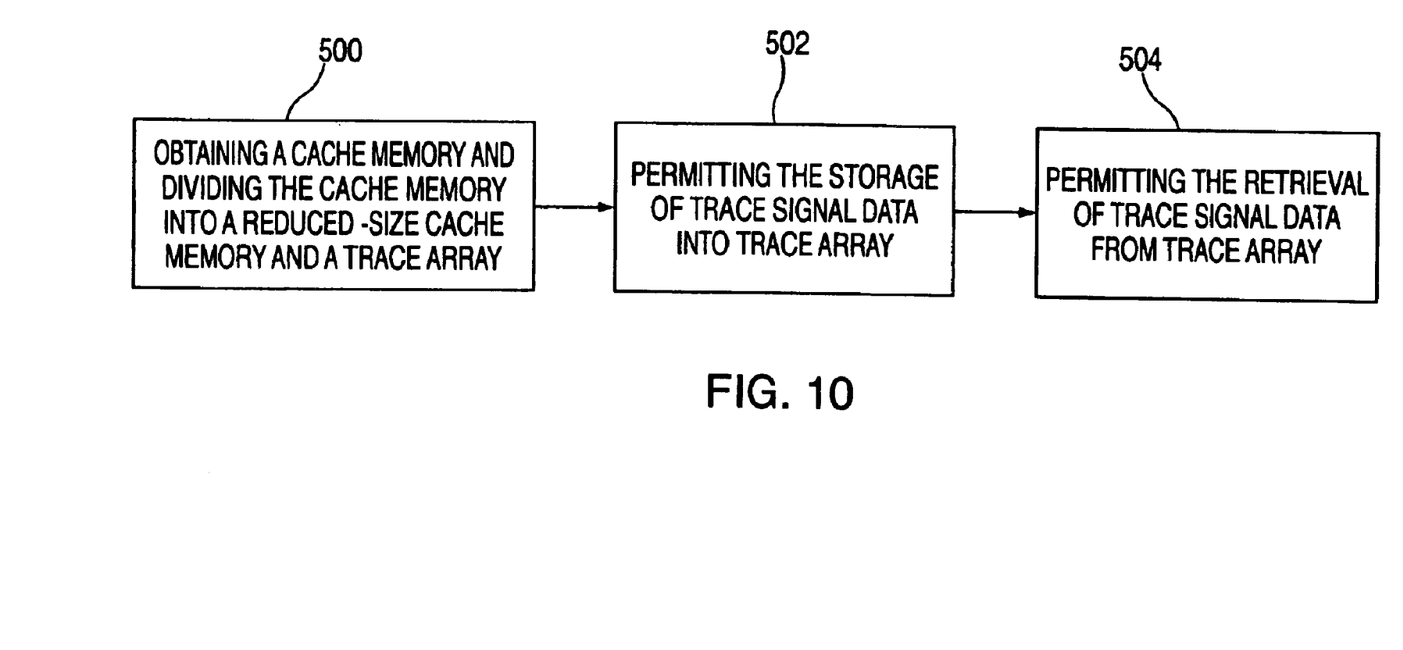
FIG. 10 is a flow diagram of a method for allocating a trace array from an original cache memory in accordance with an embodiment of the invention.

Referring to the FIG. 10, a method for allocating a trace array from a cache memory in accordance with an embodiment of the invention is discussed. As shown in step 500, in light of the discussion hereinabove, a cache memory having a directory array is obtained and includes dividing said cache memory into a reduced-size cache memory and a trace array. The cache memory is preferably 512K bytes in size, but may be of any size suitable to the desired end purpose. Also, at least one of the cache memory and the reduced-size cache memory is preferably organized so as to form eight-way associativities. In accordance with an embodiment of the invention, the reduced-size cache memory and the trace array are preferably the same size. However, the cache memory may be divided such that reduced-size cache memory and the trace array may be any size suitable to the desired end purpose. The directory array includes an address field having a spare bit which is usable in a trace mode to represent a high order bit of the requested address.

In accordance with an embodiment of the invention, a trace mode is then detected and the storage of trace signal data into the trace array is permitted as shown in step 502. After storage of the trace signal data into the trace array occurs, the system-on-chip environment 10 is then permitted to retrieve the trace signal data from the trace array as needed as shown in step 504. In accordance with an embodiment of the invention, the permitted retrieval of the trace signal data from the trace array may be configured as a broadside output from the trace array or may be configured as a compartmentally selected output from the trace array or any combination thereof.

In accordance with an embodiment of the invention, a self-timed interconnect signal using the trace array is characterized and once the characterizaion is compete, the reduced-size cache is then switched back so as to allow the cache memory to function as before. Also in accordance with an embodiment of the invention, the self-timed interconnect signal may either be multiplexed, time-shared or a combination thereof with other signals that are being stored in the trace array.

In accordance with an embodiment of the invention, the cache memory is preferably comprised of a system-on-chip environment 10 and the combination of the reduced-size cache memory and the trace array preferably includes a split cache that spans the addressable space of the entire cache memory. Also, in accordance with an embodiment of the invention, the reduced-size cache memory and the trace array are each preferably associated with a separate output bus.

Also, in accordance with an embodiment of the invention, a cache memory is provided which includes an apparatus or method for dividing the cache memory into a reduced-size cache memory and trace array and an apparatus or method for permitting the storage of a trace signal data into the trace array and an apparatus or method for permitting retrieval of the trace signal data from the trace array.

An advantage of the described exemplary embodiments is that a trace storage area is provided that is useable as a cache memory during normal operation such that the on-chip real estate used for the trace array during testing is efficiently utilized as a cache array during normal operation.

Processing of FIG. 10 may be implemented through a controller operating in response to a computer program. In order to perform the prescribed functions and desired processing, as well as the computation therefore, the controller may include, but not be limited to, a processor(s), computer(s), memory, storage, register(s), timing, interrupt (s), communication interface(s), and input/output signal interface(s), as well as combinations comprising at least one of the foregoing.

The disclosed invention can be embodied in the form of a computer or controller implemented processes. The present invention can also be embodied in the form of computer program code containing instructions embodied in tangible media, such as floppy diskettes, CD-ROMs, hard drives, or any other computer-readable medium, wherein when the computer program code is loaded into and executed by a computer or controller, the computer or controller becomes an apparatus for practicing the invention. The present invention can also be embodied in the form of computer program code, for example, whether stored in a storage medium, loaded into and/or executed by a computer or controller, or transmitted over some transmission medium, such as over electrical wiring or cabling, through fiber optics, or via electromagnetic radiation, wherein when the computer program code is loaded into and executed by a computer or a controller, the computer or controller becomes an apparatus for practicing the invention. When implemented on a general-purpose microprocessor, the computer program code segments configure the microprocessor to create specific logic circuits.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of allocating a trace array from a cache memory, comprising:
   dividing said cache memory into a reduced-size cache memory and a trace array;
   permitting storage of trace signal data into said trace array; and
   permitting retrieval of said trace signal data from said trace array;
   wherein said cache memory comprises a directory array;
   wherein said directory array comprises an address field having a spare bit usable in a trace mode to represent a high order bit of a requested address.

2. A method as defined in claim 1 wherein said reduced-size cache memory is equal in size to said trace array.

3. A method as defined in claim 1 wherein said reduced-size cache memory is not equal in size to said trace array.

4. A method as defined in claim 1 wherein said cache memory is 512K bytes in size.

5. A method as defined in claim 1 wherein at least one of said cache memory and said reduced-size cache memory is organized in eight-way associativities.

6. A method as defined in claim 1 wherein said cache memory comprises a directory array.

7. A method as defined in claim 1, further comprising:
   detecting a trace mode.

8. A method as defined in claim 1 wherein said cache memory is comprised by a system-on-chip environment.

9. A method as defined in claim 1 wherein the combination of said reduced-size cache memory and said trace array comprises a split cache spanning the addressable space of said cache memory.

10. A method as defined in claim 1 wherein the permitted retrieval of said trace signal data from said trace array is configured as a broadside output from said trace array.

11. A method as defined in claim 1 wherein the permitted retrieval of said trace signal data from said trace array is configured as a compartmentally selected output from said trace array.

12. A method as defined in claim 1 wherein said reduced-size cache memory and said trace array are each associated with a separate output bus.

13. A method as defined in claim 1, further comprising:
    characterizing a self-timed interconnect using said trace array; and
    switching back to the original cache functionality once characterization is complete.

14. A method as defined in claim 13, further comprising:
    at least one of multiplexing and time-sharing said self-timed interconnect signals with other signals to be stored in said trace array.

15. A storage medium encoded with a machine-readable computer program code for allocating a trace array from an original cache memory, said storage medium including instructions for causing a computer to implement a method comprising:
    dividing said cache memory into a reduced-size cache memory and a trace array;
    permitting storage of trace signal data into said trace array; and
    permitting retrieval of said trace signal data from said trace array;
    wherein said cache memory comprises a directory array;
        wherein said directory array comprises an address field having a spare bit usable in a trace mode to represent a high order bit of a requested address.

16. A cache memory comprising:
    means for dividing said cache memory into a reduced-size cache memory and a trace array;
    means for permitting storage of trace signal data into said trace array; and
    means for permitting retrieval of said trace signal data from said trace array.

* * * * *